United States Patent [19]

Harder et al.

[11] Patent Number: 4,550,988

[45] Date of Patent: Nov. 5, 1985

[54] SIDE REAR VIEW MIRROR CLEANING SYSTEM

[76] Inventors: Benjamin P. Harder, 141 Shadywood La., Delano, Minn. 55328; Willard J. Harder, 8556 Hiawatha Ave., Eden Prairie, Minn. 55344

[21] Appl. No.: 528,620

[22] Filed: Sep. 1, 1983

[51] Int. Cl.⁴ .................................................. G02B 5/08
[52] U.S. Cl. ................................................... 350/584
[58] Field of Search .......................... 350/584, 607–608

[56] References Cited

U.S. PATENT DOCUMENTS

| | | |
|---|---|---|
| 1,544,244 | 6/1925 | Lehmann et al. |
| 2,367,426 | 1/1945 | Patterson |
| 2,758,509 | 8/1956 | Owens ................................ 350/584 |
| 3,059,540 | 10/1962 | Robinson ............................ 350/584 |
| 3,059,790 | 10/1962 | Augustus |
| 3,063,748 | 11/1962 | Keeler |
| 3,166,630 | 1/1965 | Esslinger |
| 3,455,624 | 7/1969 | Godfrey ............................. 350/584 |
| 3,830,561 | 8/1974 | La Fave et al. |
| 3,937,563 | 2/1976 | Frabe |
| 4,134,612 | 1/1979 | Nelson |
| 4,196,930 | 4/1980 | Busche |
| 4,200,327 | 4/1980 | Wepler |
| 4,248,497 | 2/1981 | Leighton ............................ 350/584 |

FOREIGN PATENT DOCUMENTS 2708173 8/1978 Fed. Rep. of Germany.
1020576 2/1966 United Kingdom ................ 350/584

OTHER PUBLICATIONS

Rear-Safety-View Mfg. Co., Dallas-Fort Worth Airport, TX.
Re-Trac Catalog, pp. 8 and 9.

Primary Examiner—William H. Punter
Attorney, Agent, or Firm—Burd, Bartz & Gutenkauf

[57] ABSTRACT

A rear view mirror mounted on the side of a truck is equipped with an air deflector and fluid dispenser for clearing foreign material from the viewing surface of the mirror. The air deflector has a generally flat forwardly directed section joined to a curved middle section. A terminal section joined to the curved section has a lip forming a passage for collecting foreign material and fluids from the air directed toward the viewing surface. The fluid dispenser has an elongated tube provided with a plurality of fluid discharge orifices. The tube is mounted on the lip with a plurality of releasable clips. Fluid under pressure supplied to the tube is directed onto the one side edge of the mirror and carried across the mirror surface with a moving sheet of air to clear mirror surface of foreign materials, such as insects, dust, dirt, mud, snow, ice and rain.

35 Claims, 9 Drawing Figures

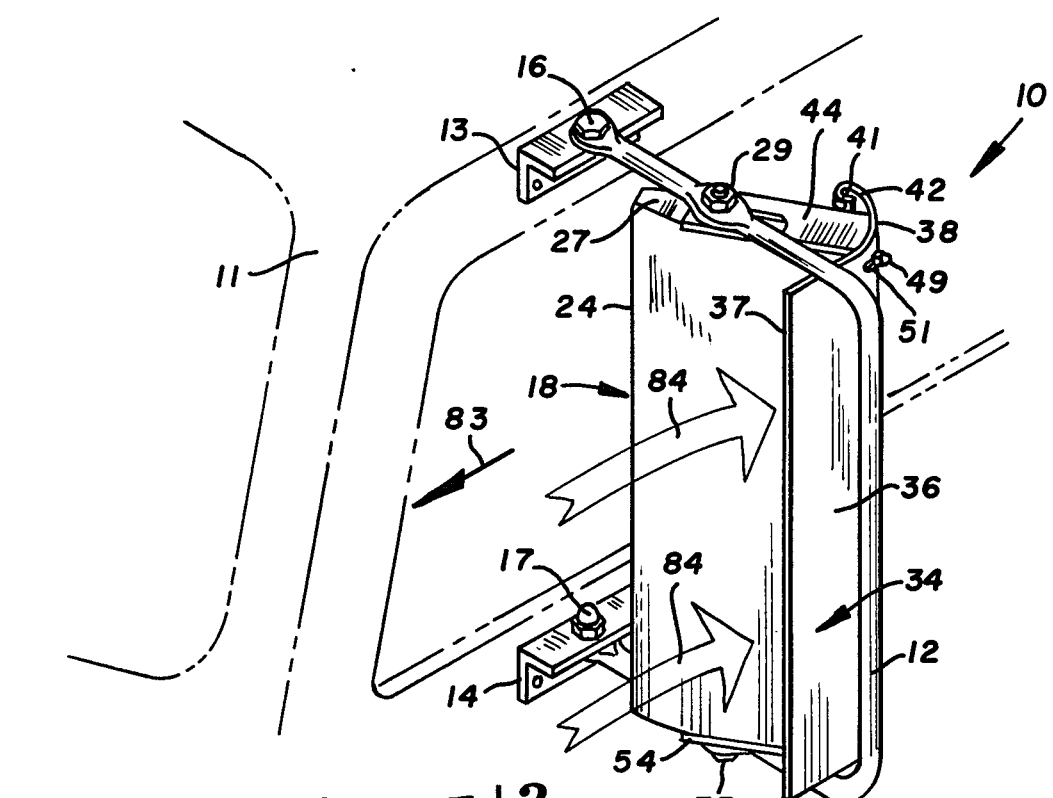
FIG.1
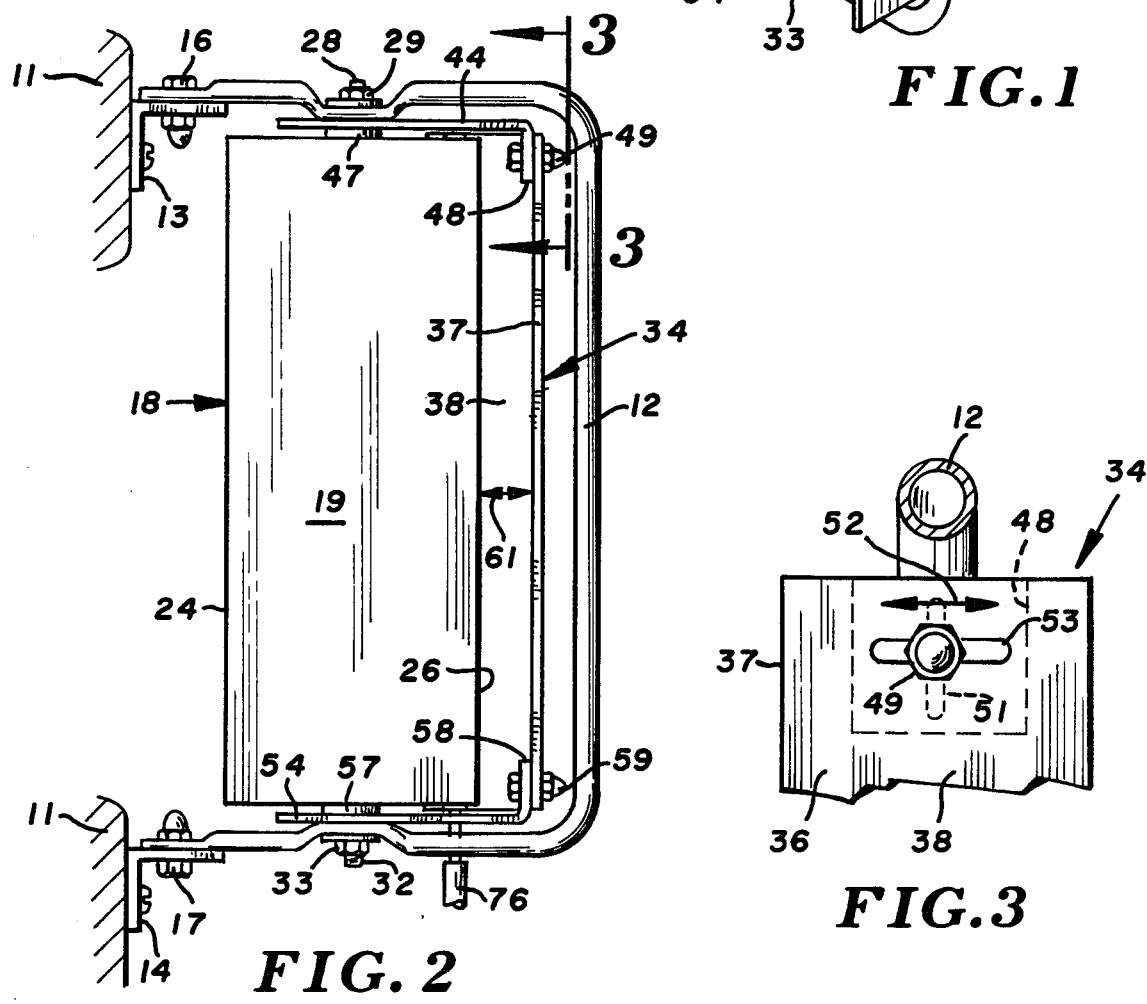
FIG.2
FIG.3

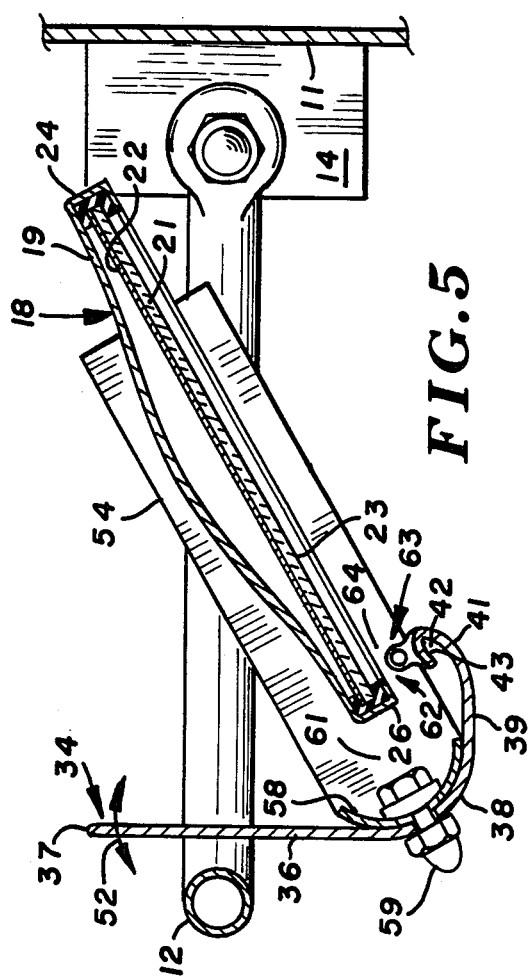
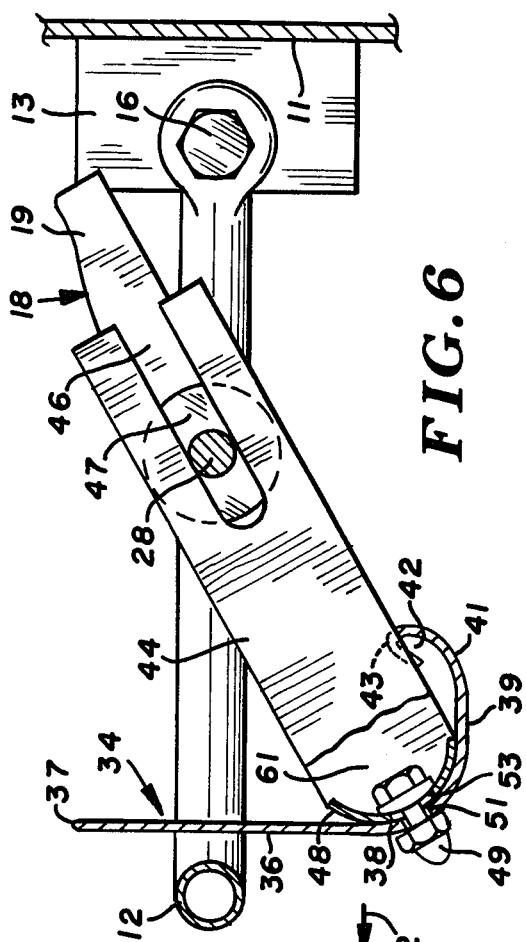
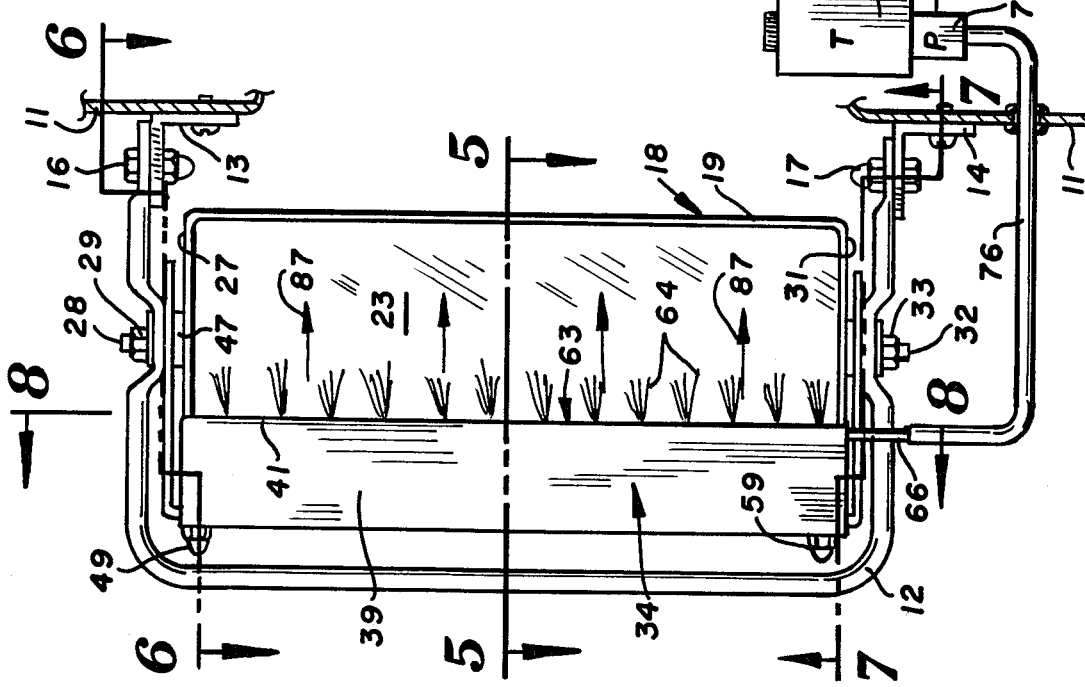

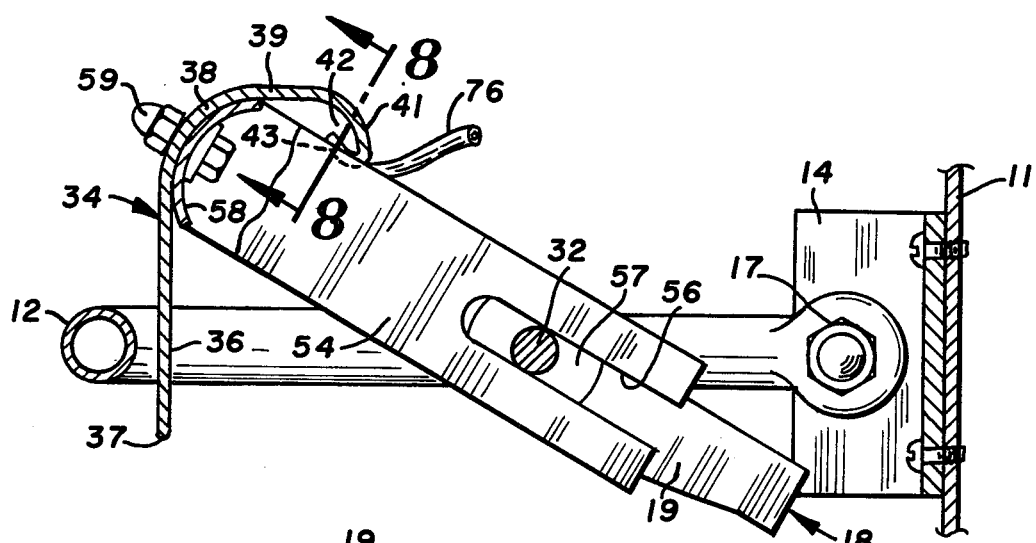
FIG.7
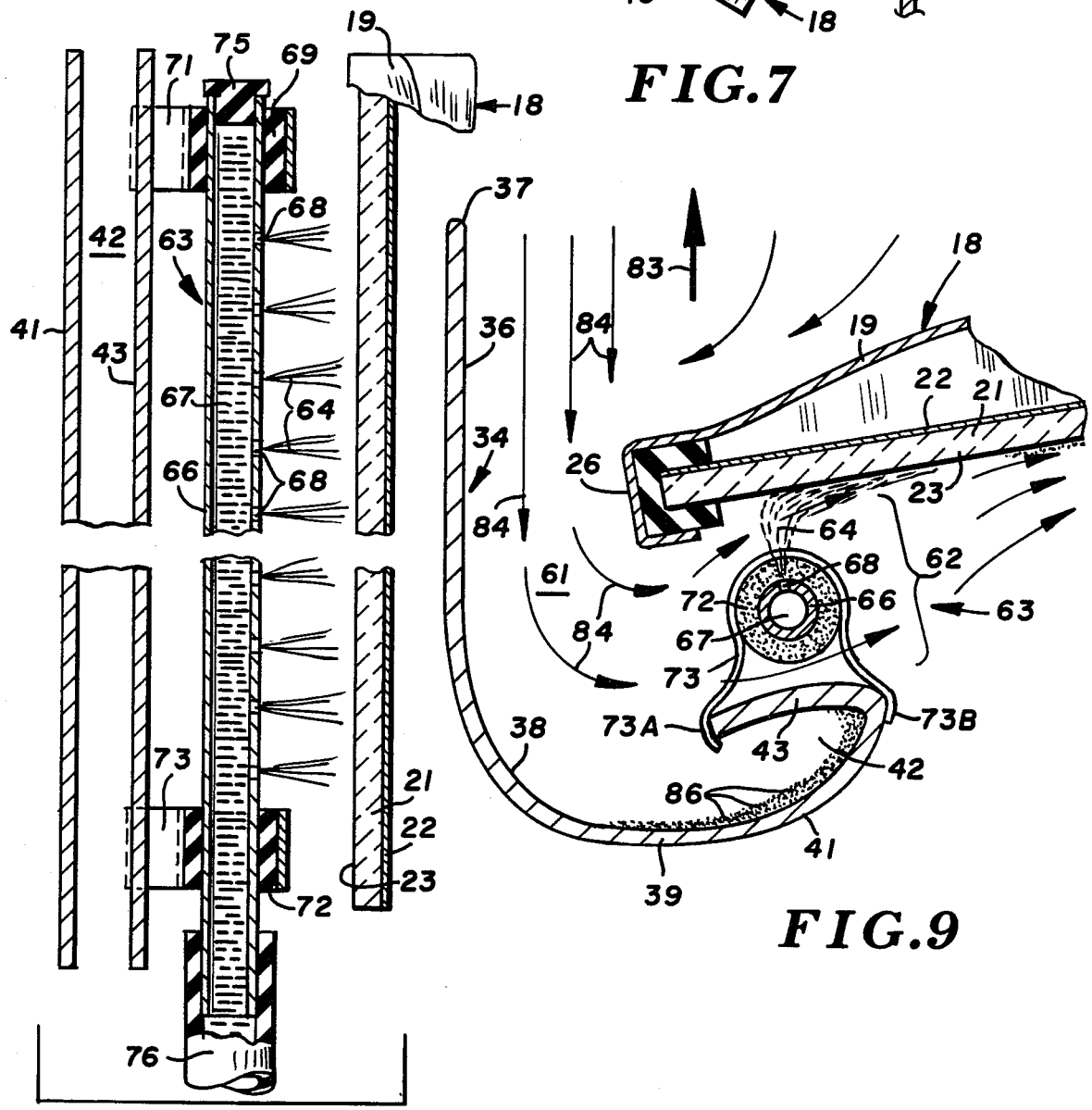
FIG.8
FIG.9

SIDE REAR VIEW MIRROR CLEANING SYSTEM

FIELD OF INVENTION

The invention relates to air deflecting and fluid dispensing devices for directing air across a surface to remove accumulated foreign material from the surface. The device is directed to a vehicle side view mirror air deflector for deflecting a moving sheet of air across the viewing mirror surface of the rear view mirror and simultaneously dispensing a cleaning fluid into the sheet of air to clear foreign material from the viewing mirror surface of the rear view mirror.

BACKGROUND OF INVENTION

Highway vehicles, such as trucks, automobiles, and the like are equipped with side view mirrors to enable the driver of the vehicle to be aware of traffice conditions on both sides and the rear of the vehicle. The side view mirrors are located in the environment adjacent the side of the vehicle where they can accumulate foreign road particles, such as snow, frost, mud, dirt, dust, salt, water, insects and the like. This foreign material impairs the viewing characteristics of the mirror. The mirrors are periodically cleaned. During adverse weather conditions, the side view mirrors cannot be effectively cleaned, thereby reducing their visual effectiveness.

Deflectors have been proposed to cause air to flow over the mirror surface to remove the foreign matter therefrom. An example of this type of deflector is shown by Robinson in U.S. Pat. No. 3,059,540. The Robinson rear view mirror has a generally U-shaped air intercepting channel or trough mounted on the outer peripheral frame of the vehicle. The trough directs air through holes around the periphery of the mirror toward the center of the reflecting surface of the mirror. In another device, shown by Busche in U.S. Pat. No. 4,196,930, a plurality of air deflectors are located forwardly of the side view mirror. The deflectors direct air outwardly, upwardly, and downwardly around the side view mirror to prevent the foreign material from accumulating on the reflecting surface of the mirror. The device operates to prevent the foreign material from reaching the viewing surface of the mirror.

SUMMARY OF INVENTION

The invention is directed to an apparatus for keeping or clearing foreign material from the viewing surface of a rear view mirror. A frame means attached to the side of a vehicle supports the mirror in an adjustable position so that the operator of the vehicle can view the road and traffic adjacent the side and the rear of the vehicle. An air deflector means directs a continuously moving sheet of air across the viewing surface of the mirror to inhibit the accumulation of foreign material, such as mud, salt, insects, snow, and the like, from accumulating on the mirror surface. The air deflector means has a first section joined to a curved section and a terminal or outlet section located adjacent one edge of the mirror surface. The air deflector means collects and deflects the air around one edge of the mirror and onto the mirror surface. The rapidly moving air removes foreign material from the mirror surface and carries the foreign material laterally across the surface, thereby clearing the mirror surface of foreign material.

In one form of the invention, a fluid dispensing means operates to discharge a cleaning fluid onto the mirror surface. The cleaning fluid, preferably a liquid, is carried across the mirror surface by the moving sheet of air. The foreign material is picked up by the cleaning fluid and removed from the mirror surface by the moving air and fluid.

According to an embodiment of the apparatus for cleaning foreign material from the mirror surface of a rear view mirror, a pair of adjustable mounts adjustably support the air deflector means adjacent one side edge of the mirror. Preferably, the air deflector means is located adjacent the vertical outside edge of the mirror. The adjustable mounts have slots to allow adjustment of the lateral position of the air deflector means relative to one side edge of the mirror, as well as the vertical and angular position of the air deflector means. This allows the air deflector means and the mounts to be used with different types and styles of mirrors without altering the size and shape of the air deflector means. The adjustable mounts permit adjustment of the location of the air deflector means relative to the mirror surface to achieve maximum cleaning effectiveness of the mirror surface.

The fluid dispenser means comprises an elongated linear tube located between the lip of the third section of the air deflector means and the outside upright edge of the mirror surface. A pair of releasable clips secured to sleeves accommodating the tube support the tube on the lip. The clips are releasably mounted on the lip of the air deflector means. The cleaning fluid is discharged into the air moving through the Venturi throat formed by the lip and the adjacent outside edge of the mirror surface. The rapidly flowing air moving through the Venturi throat breaks down the cleaning fluids and disperses the cleaning fluid onto the mirror surface. The cleaning fluid, in conjunction with the rapidly moving air, effectuates a scrubbing and cleaning action, which clears the mirror surface of foreign material in an efficient and effective manner without the wiping and scrubbing by the vehicle operator.

DESCRIPTION OF DRAWING

FIG. 1 is a perspective view of a rear view mirror mounted on the side of a motor vehicle equipped with the air deflecting and fluid dispensing device of the invention;

FIG. 2 is an enlarged front elevational view of the rear view mirror and air deflecting and fluid dispensing device of FIG. 1;

FIG. 3 is an enlarged sectional view taken along line 3—3 of FIG. 2;

FIG. 4 is an enlarged rear elevational view of the rear view mirror and air deflecting and fluid dispensing device of FIG. 1;

FIG. 5 is an enlarged sectional view taken along line 5—5 of FIG. 4;

FIG. 6 is an enlarged sectional view taken along line 6—6 of FIG. 4;

FIG. 7 is an enlarged sectional view taken along line 7—7 of FIG. 4;

FIG. 8 is an enlarged foreshortened sectional view taken along line 8—8 of FIG. 7; and FIG. 9 is a diagrammatic view of the air deflector and fluid dispensing apparatus illustrating the deflected air flow and dispensed fluid for cleaning the mirror surface of a rear view mirror.

DESCRIPTION OF THE PREFERRED EMBODIMENT

Referring to FIGS. 1, 2 and 4, there is shown a rear view mirror assembly indicated generally at 10, mounted on the side of a cab 11 of a truck. Mirror assembly 10 is useable with other types of motor vehicles such as pick-up trucks, automobiles, motor homes, vans, tractor trucks and the like. Rear view mirror assembly 11 has a generally U-shaped frame 12 mounted on an upper bracket 13 and a lower bracket 14. Brackets 13 and 14 are secured to the side of cab 11 with conventional fasteners, such as bolts and screws. Nut and bolt assemblies 16 and 17 pivotally connect the ends of frame 12 to angle brackets 13 and 14. The nut and bolt assemblies 16 and 17 can be spring-tensioned rachets to allow for the automatic focusing and adjustment of mirror assembly 10 about an upright axis. The nut and bolt assembly 16 and 17 can also allow retraction of mirror assembly 10 in either direction for maximum clearance.

Rear view mirror assembly 10 has a side view mirror indicated generally at 18. Mirror 18 has a generally rectangular casing or housing 19 carrying a transparent sheet member 21, such as glass or plastic. The inner surface of member 21 has a light reflector sheet or film 22 that provide the optical image. Sheet member 21 has a smooth continuous flat outside surface 23 exposed to the outside environment. The road foreign materials collect on surface 23 and impair the visual rear view image on the mirror. Housing 19 has an upright linear inside edge 24 and an upright linear outside edge 26 opposite inside edge 24. The edges 24 and 26 are joined to top wall 27 and a bottom wall 31. As shown in FIGS. 4 and 6, an upright bolt or pivot support 28 secures the midsection of housing 19 to the top of frame 12. A nut 29 threaded on bolt 28 holds the mirror in an adjusted position relative to the axis of bolt 28. A second bolt or pivot support 32 extends downward from bottom 31 and extends through a hole in the bottom portion of frame 12. A nut 33 threaded on bolt 32 holds the bottom of frame 19 in assembled relation with frame 12. Bolts 28 and 32 can be a single rod extended longitudinally through housing 19 and threaded on the opposite ends thereof. Side view mirror 18 and its support frame 12 is a conventional vehicle side view mirror. Other types of rear view mirrors are useable with the rear view mirror clearing apparatus of the invention.

In use, outside mirror surface 23 accumulates road matter, such as dirt, dust, snow, frost, mud, salt, water, insects and the like. This foreign material diminishes the viewing effectiveness of the mirror. The mirror must be periodically cleaned to provide the driver of the vehicle with a satisfactory side view and rear view of the road and traffic. The rear view mirror clearing apparatus of the invention continuously operates when the vehicle is moving to inhibit the collection of foreign material on the mirror surface 23 and is operable to discharge a cleaning liquid on surface 23 to facilitate the clearing of foreign material therefrom.

The rear view mirror cleaning apparatus has an air deflector indicator generally at 34 located adjacent the outside edge 26 of mirror 18. Air deflector 34 functions to direct a rapidly moving sheet of air laterally across mirror surface 23. The rapidly moving air picks up and removes the foreign material from mirror surface 23. Air deflector 34 is located in general lateral alignment adjacent the outside of mirror 18 so that it does not impair the view of the vehicle driver.

Air deflector 34, shown in FIGS. 4, 6, 7, and 9, has a first generally flat plate section or body 36 located in a generally vertical plane. Body 36 has an upright linear forward or leading edge 37. Body 36 is joined to a second curved middle section 38 having a convex curved inner surface. Middle section 38 is joined to a generally flat section 39 normally disposed with respect to first section 36. A curved terminal or trailing end section 41 is joined to flat section 39. End section 41 is curved toward mirror surface 23. End section 41 has an upright groove or pocket 42 formed with an inwardly directed vertical reverse lip 43. Lip 43 is laterally spaced from the outer vertical edge of mirror surface 23 to provide a restricted linear air passage or throat 62. Air deflector 34 is a one-piece metal member. Preferably air deflector 34 is an extruded aluminum member. Other types of materials, such as metal, plastic, and the like, can be used to make air deflector 34.

Air deflector 34 is held in an adjusted assembled relation with mirror 18 with a pair of mounts or brackets 44 and 54. As shown in FIG. 6, bracket 44 has a horizontal slot 28 accommodating bolt 28. A washer 47 is interposed between bracket 44 and the top 27 of mirror 18. The outer end of bracket 44 has a downwardly directed curved ear 48 accommodating a nut and bolt assembly 49. Ear 48 has a convex curved outer surface having the same curvature as the inside surface of air deflector section 38 to locate ear 48 in surface engagement with section 38. As shown in FIG. 3, the second or curved section 38 of air deflector 34 has a horizontal slot 51 accommodating nut and bolt assembly 49. Slot allows air deflector 34 to be angularly adjusted as indicated by the arrow 52. Returning to FIG. 6, curved ear 48 has a vertical slot 53 allowing vertical adjustment of air deflector 34.

The second or bottom mount of 54, shown in FIG. 7, has a horizontal slot 56 accommodating pivot bolt 32. A washer 57 is interposed between bracket 54 and the bottom 31 of mirror 18. A nut and bolt assembly 59 secures air deflector 34 to curved ear 58. Ear 58 has the same curvature as ear 48. The curvature of ears 48 and 58 control the angular adjustment of air deflector 34 about a generally upright axis. Air deflector 34 has a lower horizontal slot which is aligned with a vertical slot in ear 58 to provide circumferential and vertical adjustment of air deflector 34. The horizontal and vertical slots are identical to slot 51 and 53 shown in FIGS. 3 and 6. These adjustments also allow alir deflector 34 to be used with different types of mirrors and mirror-mounting structures.

As shown in FIGS. 2 and 5, curved midsection 38 is laterally spaced from outer edge 26 of mirror 18 by a vertical air passage 61. The width of passage 61 can be adjusted by laterally moving mounts 44 and 54 relative to bolts 28 and 32. Nuts 29 and 33 are turned down to hold brackets 44 and 54 in their adjusted positions. The arcuate adjustment of air deflector 34 allows for adjustment of the width of the Venturi throat or restricted air passage 62 between upright lip 43 and the adjacent outside edge of mirror surface 23. These adjustments allow air deflector 34 to be adjusted to provide the continuous and linear throat 62 between lip 43 and the adjacent linear edge portion of mirror surfaces 23. The air passages 61 and throat 62 extend the length of mirror 18.

As shown in FIGS. 5, 8 and 9, a fluid-dispensing apparatus indicated generally at 63 functions to dispense or discharge a linear spray 64 of cleaning fluids, such as an alcohol and water mixture, water, and the like onto the mirror surface 23. Dispensing apparatus 63 comprises an upright linear tube 66 having a passage 67 for accommodating the cleaning fluid under pressure. Tube 66 has the plurality of spaced orifices 68, such as holes or slits, directed toward mirror surface 23. The upper end of tube 66 accommodates a sleeve 69 of resilient material such as rubber, plastic and the like. Shown in FIG. 6, sleeve 69 is located in a holding member or C-shaped clip 71 clamped on lip 43. A second sleeve 72 of resilient material is located about the bottom of tube 66 and positioned in a holding member or C-shaped clip 73 mounted on lip 43. Clips 71 and 73 are semi-circular springs compressed about sleeves 69 and 72 to firmly hold tube 66 in an adjusted position. Clips 71 and 73 can be bonded to sleeves 69 and 72. As shown in FIG. 9, clip 71 has hooks 73A and 73B snapped onto opposite edges of lip 43. Clip 69 has similar hooks snapped onto opposite edges of lip 43. The lip 43 can be provided with a pair of curved arcuate flanges in lieu of clips 71 and 73 to hold tube 66 in throat passage 62. Sleeve 69 and 72 hold tube 66 laterally spaced from mirror surface 23 as shown in FIGS. 8 and 9 to allow substantial portions of a sheet of air to flow between tube 66 and mirror surface 23. Air also flows between tube 66 and lip 43.

The upper end of tube 66 is closed with a plug 75. Referring to FIG. 4, a flexible hose 76 is telescoped onto the lower end of tube 66 and extends into the vehicle to pump 77. Pump 77 is connected to tank or reservoir 78 accommodating the cleaning fluid, such as alcohol and water. A switch 79 having a manually operated actuator 81 is electrically coupled to an electric motor driving pump 77. When switch 79 is turned to its on position, the motor of pump 77 is connected to an electrical power source, such as the battery of the vehicle. Pump 77 operates to pump the cleaning fluid from tank 78 through hose 76 and into tube passage 67. The cleaning fluid being under pressure is discharged as a fluid spray 64 onto mirror surface 23. The fluid is directed to the outer edge of mirror surface 23 from the top to the bottom thereof.

In use, the vehicle is driven in a forward direction as shown by the arrow 83 in FIGS. 1 and 9. The air flow indicated by arrows 84 is deflected from the forward side of housing 19 into the vertical air passage 61. The air deflector 36 provides a barrier for channeling the air through passage 61 and restricted air passage or throat 61. The air moving through throat 62 increases in velocity and is directed as a rapid moving sheet of air along mirror surface 23. The spray of cleaning fluid is dispersed into the moving air. The rapidly moving sheet of air adjacent to mirror surface 23 breaks up the cleaning fluid and effects a turbulent scrubbing action on the mirror surface 23. The air and cleaning fluid move across the surface 23 to clean the entire surface.

The air moving through passage 61 is turned by the curved section 38 and deflected slightly more than 90 degrees through linear throat 62. The abrupt change in direction of the flow path of the air causes the dirt, water and ice particles 86 to move around the inside surface of the curved section 38 and section 39 into pocket 42. The lip 43 prevents the collected particles 86 from re-entering the air stream at throat 62. The collected particles flow downwardly and out of the bottom of pocket 42 into the atmosphere below mirror 18.

While there has been shown and described a preferred embodiment of the air deflector and fluid dispensing apparatus of the invention for clearing a side mounted rear view mirror, it is understood that changes in the shape, size and structure of the air deflector and fluid dispensing apparatus may be made by those skilled in the art without departing from the invention. The invention is defined in the following claims.

The embodiments of the invention in which an exclusive property or privilege is claimed are defined as follows:

1. An apparatus for clearing foreign material from the viewing mirror surface of a rear view mirror adapted to be mounted on the side of a vehicle, said mirror having opposite side edges, comprising:

air deflector means for directing air across the mirror surface, means for mounting the air deflector means adjacent one side edge of the mirror, said air deflector means having a generally upright first section extended generally in the direction of forward movement of the vehicle, a curved second section joined to the first section to direct air around said one side edge of the mirror, and a third section joined to the second section to direct air toward the mirror surface, said third section having a curved end portion, said end portion having an inwardly turned lip providing a generally upright pocket for collecting particles separated from the air moving to the mirror surface, said air moving across the mirror surface, and means located adjacent said third section operable to discharge fluid onto the mirror surface, said fluid and air moving across the mirror surface to clear the mirror surface of foriegn material and fluid thereon.

2. The apparatus of claim 1 wherein: the means for mounting the air deflector means adjacent one side edge of the mirror includes means for adjusting the lateral space between the air deflector means and said one side edge of the mirror.

3. The apparatus of claim 1 wherein: the means for mounting the air deflector means adjacent one side edge of the mirror includes means for adjusting the position of the air deflector means about a generally upright axis.

4. The apparatus of claim 1 wherein: the means for mounting the air deflector means adjacent one side edge of the mirror includes means for adjusting the vertical position of the air deflector means and the angular position of the air deflector means about a generally upright axis.

5. The apparatus of claim 1 wherein: the means for mounting the air deflector means adjacent one side edge of the mirror includes first means for adjusting the lateral space between the air deflector means and said one side edge of the mirror, and second means for adjusting the vertical position and the angular position about a generally upright axis of the air deflector means.

6. The apparatus of claim 1 wherein: the first section of the air deflector means is generally flat and has an upright forward edge.

7. The apparatus of claim 6 wherein: the second section has an arcuate extent of about 90 degrees.

8. The apparatus of claim 7 wherein: the third section has a generally flat portion and said curved end portion, said end portion having an inwardly turned lip providing a vertical pocket for collecting particles separated from the air moving to the mirror surface.

9. The apparatus of claim 1 wherein: the means operable to discharge fluid onto the mirror surface includes a tube having a plurality of orifices for directing fluid toward the mirror surface, and means mounting the tube adjacent the mirror surface on the air deflector means, said tube being adapted to be connected to means to move the fluid under pressure into the tube.

10. The apparatus of claim 9 wherein: the means mounting the tube adjacent the mirror surface on the air deflector means includes a plurality of holding members for supporting the tube in spaced relation relative to the mirror surface.

11. The apparatus of claim 10 wherein: each of said holding members comprising a generally C-shaped clip releasably attached to said lip, and a resilient sleeve retained in each clip, each sleeve being mounted on a portion of said tube.

12. The apparatus of claim 1 wherein: the mirror is mounted on the vehicle with a frame having top and bottom support members, said mirror having pivot means mounted on said support members, said means mounting the air deflector means comprising an upper mount and a lower mount mounted on the pivot means, and means securing the air deflector means to the upper and lower mount.

13. The apparatus of claim 12 wherein: the upper mount and lower mount each has an elongated slot allowing adjustment of the lateral space between the air deflector means and said one side edge of the mirror.

14. The apparatus of claim 13 wherein: the air deflector means and upper and lower mounts include means for adjusting the position of the air deflector means about a generally upright axis.

15. The apparatus of claim 1 wherein: the means operable to discharge fluid onto the mirror surface includes a tube having a plurality of orifices for directing fluid toward the mirror surface, and clip means to mount the tube in spaced relation relative to said mirror surface.

16. An apparatus for clearing foreign material from the viewing surface of a rear view mirror adapted to be mounted on the side of a vehicle, said mirror having opposite side edges, comprising: air deflector means for deflecting air across the mirror surface from one side edge to the opposite side edge thereof, said air deflector means having a first section, a curved second section joined to the first section, and a third section joined to the second section for collecting and directing air onto the mirror surface of the rear view mirror, said third section having a generally curved end portion, said end portion having an inwardly turned lip providing a vertical pocket for collecting particles separated from the air moving to the mirror surface, and means for mounting the air deflector means adjacent one side edge of the mirror to laterally space said third section from said mirror surface.

17. The apparatus of claim 16 wherein: the means for mounting the air deflector means adjacent one side edge of the mirror includes the means for adjusting the lateral space between the air deflector means and said side edge of the mirror.

18. The apparatus of claim 16 wherein: the means for mounting the air deflector means adjacent one side edge of the mirror includes means for adjusting the position of the air deflector means about a generally upright axis.

19. The apparatus of claim 16 wherein: the means for mounting the air deflector means adjacent one side edge of the mirror includes means for adjusting the vertical position of the air deflector means and the angular position of the air deflector means about a generally upright axis.

20. The apparatus of claim 16 wherein: the means for mounting the air deflector means adjacent one side edge of the mirror includes first means for adjusting the lateral space between the air deflector means and said one side edge of the mirror, and second means for adjusting the vertical position of the air deflector means and angular position of the air deflector means about a generally upright axis.

21. The apparatus of claim 16 wherein: the first section of the air deflector means is generally flat and has an upright forward edge.

22. The apparatus of claim 1 wherein: the first section of the air deflector means is generally flat, said lip extended along the length of the air deflector providing elongated pocket for collecting particles separated from the air moving to the mirror surface.

23. The apparatus of claim 16 wherein: the mirror is mounted on the vehicle with a frame having top and bottom support members, said mirror having pivot means mounted on said top and bottom support members, said means mounting the air deflector means comprising an upper mount and a lower mount associated with the pivot means, and means securing the air deflector means to the upper and lower mount.

24. The apparatus of claim 23 wherein: the upper mount and the lower mount each having an elongated slot allowing adjustment of the lateral space between the air deflector means of said one side edge of the mirror.

25. The apparatus of claim 23 wherein: the air deflector means and upper and lower mounts include means for adjusting the position of the air deflector means about a generally upright axis.

26. An apparatus for clearing foreign material from the viewing surface of a rear view mirror adapted to be mounted on the side of a vehicle, said mirror having opposite side edges, comprising: air deflector means for deflecting air across the mirror surface to clear foreign material therefrom, said air deflector means having a first section extended generally in the direction of the forward movement of the vehicle, a second section joined to the first section to direct air around one side edge of the mirror, and a third section joined to the second section to direct air toward the mirror surface whereby said air moves across the mirror surface, said third section having an end portion, said end portion having an inwardly turned lip providing a pocket for collecting particles separated from the air moving to the mirror surface, and means for mounting the air deflector adjacent one side edge of the mirror to laterally space said lip from said mirror surface.

27. The apparatus of claim 26 wherein: the means for mounting the air deflector means adjacent one side edge of the mirror includes means for adjusting the lateral space between said lip and said mirror surface.

28. The apparatus of claim 26 wherein: the third section has a generally flat portion and a curved end portion, said lip being joined to the curved end portion and providing therewith an upright pocket for collecting particles separated from the air moving to the mirror surface.

29. The apparatus of claim 26 including: means located adjacent said lip operable to discharge fluid unto the mirror surface, said fluid and air moving across the mirror surface to clear the mirror surface of foreign material and fluid thereon.

30. The apparatus of claim 29 wherein: the means operable to dischage fluid unto the mirror surface includes a tube having a plurality of orifices for directing fluid toward the mirror surface, and means mounting the tube adjacent the mirror surface on the deflector means, said tube being adapted to be connected to means to move the fluid under pressure into the tube.

31. The apparatus of claim 30 wherein: the means mounting the tube adjacent to mirror surface on the deflector means includes a plurality of holding members attached to the lip for supporting the tube in spaced relation relative to the mirror surface.

32. An apparatus for clearing foreign material from the viewing mirror surface of a rear view mirror adapted to be mounted on the side of a vehicle, said mirror having opposite side edges comprising: air deflector means for directing air across the mirror surface, said air deflector means having a first section extended generally in the forward movement of the vehicle, a second section joined to the first section to direct air around said one edge of the mirror and a third section joined to the second section to direct air toward the mirror surface of the rear view mirror, said third section including an inwardly turned lip joined to the third section providing a generally upright pocket for collecting particles separated from the air moving to the mirror surface, and means for mounting the air deflector means adjacent one side edge of the mirror to laterally space said third section from said mirror surface, said means for mounting the air deflector means including first means for adjusting the lateral space between the air deflector means and said one side edge of the mirror, and second means for adjusting the vertical position and the angular position of the air deflector means about a generally upright axis of the air deflector means, said second means providing for adjustment of said lip relative to said mirror surface, said second means including a elongated slots in said air deflector means mounts means, and fastening means connecting the air deflector means to the mount means, said fastener means extended through said elongated slots whereby the third section of the deflector means can be adjusted relative to the said mirror surface.

33. The apparatus of claim 32 wherein: said mount means comprises an upper mount and a lower mount, each of said mounts having an elongated slot allowing adjustment of the lateral space between the air deflector means and said one side edge of the mirror.

34. The apparatus of claim 32 including: means located adjacent said third section operable to discharge fluid unto the mirror surface, said fluid and air moving across the mirror surface to clear the mirror surface of foreign material and fluid thereon.

35. The apparatus of claim 34 wherein: the means operable to discharge fluid unto the mirror surface includes a tube having a plurality of orifices for directing fluid toward the mirror surface, and means mounting the tube adjacent the mirror surface on the third section of the deflector means, said tube being adapted to be connected to means to move fluid under pressure into the tube.

* * * * *